United States Patent Office 3,328,843
Patented July 4, 1967

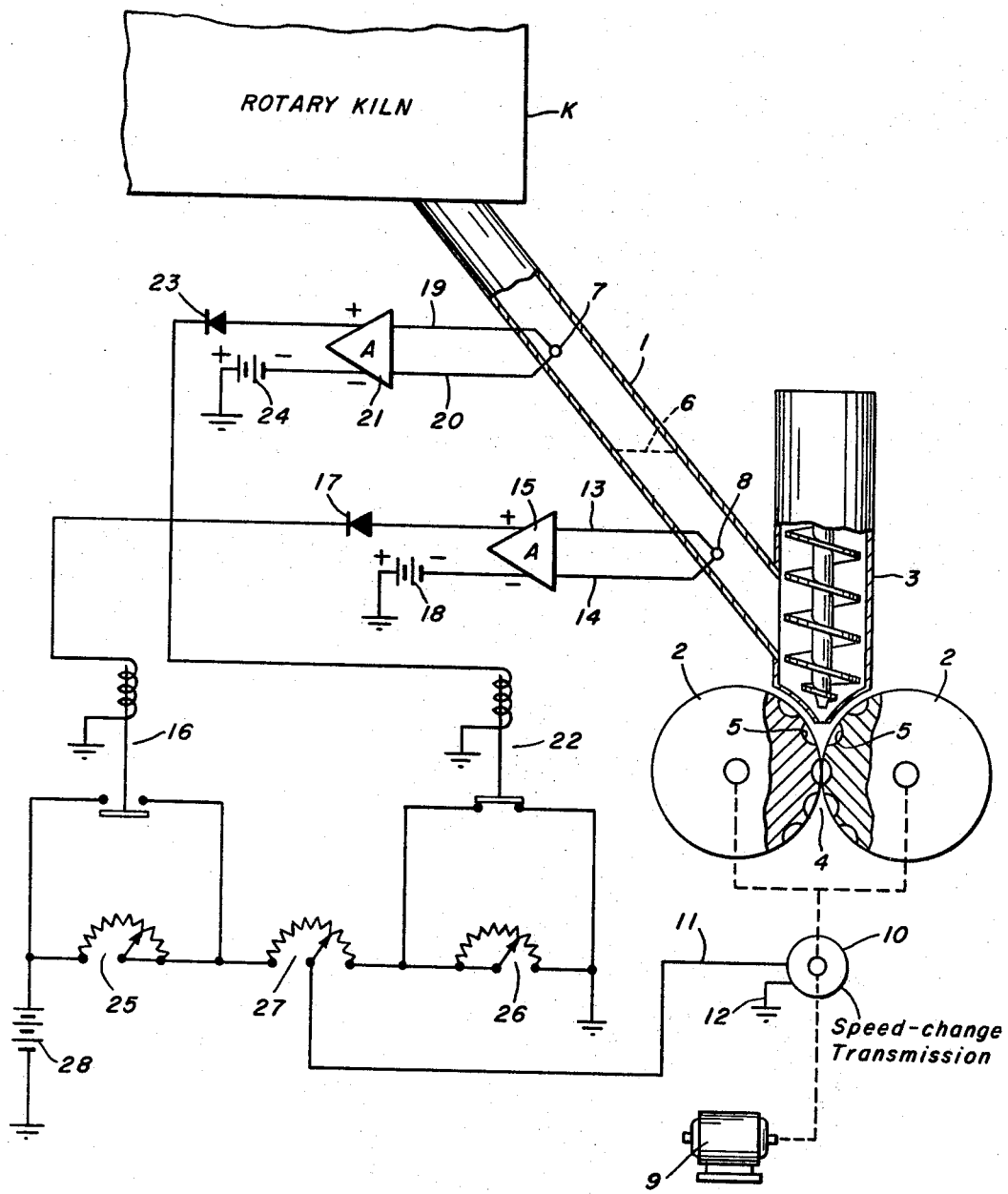

3,328,843
SPEED-CONTROL SYSTEM FOR BRIQUETTING ROLLS
Joseph A. Murphy, Jr., Franklin Township, Westmoreland County, and Donald E. Rohaus, Monroeville, Pa., assignors to United States Steel Corporation, a corporation of Delaware
Filed June 3, 1965, Ser. No. 461,120
9 Claims. (Cl. 18—21)

This invention relates to briquetting presses of the roll-type and, more particularly, to a control system for regulating the speed of briquetting rolls in accordance with the rate at which loose material to be formed into briquettes is fed thereto. In a manner to be described, the briquetting rolls are operated to maintain the material being fed thereto at a vertical level between upper and lower limits in a supply chute so that the briquettes which are produced will have the required density and hardness.

The invention is especially suited for apparatus in which briquettes are formed from heated iron-ore fines or other iron-bearing materials such as blast furnace flue dust. In such apparatus the flue dust or other iron-bearing material is heated in a rotary kiln or on a travelling grate to a fusing or sintering temperature and is then fed to a press where it is shaped into briquettes. Roll-type presses for this purpose comprise a vertical rolling pass defined by a pair of cylindrical roll bodies which are mounted for rotation about parallel axes and have matching pillow-shaped pockets about their circumferential surfaces in which the briquettes are shaped. From the kiln the heated material is delivered to the briquetting rolls through a vertically inclined transfer chute that has a screw-feeder at its lower end for delivering the material to the vertical pass between the briquetting rolls. Unless the chute is kept filled with material to a level sufficiently high above the connection at its lower end with the screw-feeder, the resulting briquettes will not have the density and hardness which is required to withstand subsequent handling and the severe conditions imposed by the blast furnace. However, if an excessive quantity of material builds up in the chute, plugging of the kiln or transfer chute may result, or the fines may fuse together as a result of overheating.

This invention accordingly has as one of its objects the provision of a control system which will regulate the speed of the briquetting operation in accordance with the rate at which the material to be briquetted is discharged from a heating furnace.

A further object of the invention is to provide a system that controls the speed of the briquetting rolls relative to the quantity of material present in the transfer chute. In the presence of material within the chute exceeding the desired amount, the speed of the briquetting rolls is automatically increased to reduce the material in the chute to the desired level. If the material within the chute becomes less than that required for efficient operation, the speed of the briquetting rolls is automatically decreased to increase the material in the chute to the desired level.

Other objects and advantages of the invention will be apparent from the following description and the accompanying drawing, in which the single figure is a diagrammatic illustration of a roll-type hot-ore briquetting installation equipped with speed control apparatus constructed in accordance with the principles of this invention.

The drawings illustrate diagrammatically the general arrangement of a vertically inclined transfer chute 1 through which loose material gravitates from a heating furnace to a pair of briquetting press rolls 2. The chute 1 is shown connected at its upper end, for example, to the discharge port of a rotary kiln K from which it receives heated material such as hot-ore fines. At its lower end the chute 1 is coninected to a screw feeder 3 that receives the hot-ore fines from the chute and feeds them to the briquetting rolls 2. The rolls 2 are mounted for rotation about laterally spaced parallel axes and define a vertical rolling pass 4 for the loose material delivered thereto by the feeder 3. Matching cavities 5 at circumferentially spaced intervals about the peripheries of the rolls 2 shape the material moving through the pass 4 into briquettes. In the general arrangement of transfer chute 1, screw feeder 3, and rolls 2, which is conventional and is further shown in A. H. Brisse et al. Patent No. 3,174,-846 and the co-pending application of Donald E. Rohaus, Ser. No. 368,221, filed May 18, 1964, the lower end of the chute 1 must be filled with hot-ore fines to a predetermined level, for example, as indicated by the broken line 6, in order to produce briquettes of the desired density and hardness. As stated above, plugging of the chute 1 may occur if this level rises materially and briquettes of the desired density will not be produced if it lowers by an appreciable amount. In conventional arrangements this level varies over wide limits since the amount of material removed from the lower end of the feeder 3 is determined by the speed of rotation of the rolls 2 and heating furnaces such as rotary kilns do not discharge material at a steady rate.

As stated above, the speed control system of this invention operates to vary the speed of the rolls 2 to compensate for variations in the rate at which material is delivered by a heating furnace to the transfer chute 1 and, more specifically, to maintain the level 6 between predetermined upper and lower limits determined respectively by the locations of vertically spaced level detecting devices 7 and 8 which are in the form of thermostats and operate when the level 6 moves above the thermostat 7 or below the thermostat 8.

For the purpose indicated, the rolls 2 are driven by an electrical motor 9 through a speed-changing means, which in the present embodiment is a conventional eddy-current clutch 10. This clutch may be Model WCS–215, manufactured by the Eaton Manufacturing Company (Dynamic Division). The clutch 10 functions to vary the speed of the rolls 2 in response to the magnitude of an input voltage applied to it via conductors 11 and 12. At increased voltages, the speed of the rolls 2 is increased, and at decreased voltages their speed is decreased.

The lower limit detecting device 8 is a thermocouple which is positioned within the insulated chute 1 at a distance from the screw feeder 3 equal to the minimum level of fines necessary in the chute 1 for the production of briquettes of the required density and hardness. The upper detecting device 7 is also a thermocouple and is located in the chute 1, at a distance from the screw feeder 3 corresponding to the maximum level of fines to be maintained within the chute. As will be explained hereinafter, the control system of this invention functions to operate the briquetting rolls at a preselected speed when the level of fines within the chute is located between the thermocouples 7 and 8 and is thus at the desired level. If the level 6 reaches the upper thermocouple 7, and thus exceeds the upper limit, such system operates to increase the speed of the briquetting rolls until the level 6 of material is again beneath the thermocouple 7. If the level 6 falls below the thermocouple 8, and is thus less than the lower limit, the speed of the briquetting rolls is decreased until the level 6 is again above the thermocouple 8. Consequently, when the material is at an undesirably low level within the chute, the slower speed of the briquetting rolls ensures the production of quality briquettes by requiring less feed material.

The leads 13 and 14 from the thermocouple 8 are connected to the input terminals of DC amplifier 15. The positive output terminal of the amplifier 15 is connected to a normally open relay 16 through a rectifier 17. The negative terminal of this amplifier is connected to the negative terminal of a battery 18. The leads 19 and 20 of the thermocouple 7 are connected to the input terminals of DC amplifier 21. The positive output terminal of the amplifier 21 is connected to a normally closed relay 22 through a rectifier 23. The negative terminal of this amplifier is connected to the negative terminal of a battery 24. The relays 16 and 22 are in parallel with variable resistors 25 and 26, respectively. The resistors 25 and 26 are connected in series with an additional variable resistor 27 and a battery 28. The resistor 25 is interposed between the battery 28 and the resistor 27, and the resistor 26 is interposed between ground and the resistor 27. With this arrangement the resistance provided by resistor 25 serves to decrease the potential existing between the slider arm of resistor 27 and ground, and the resistance provided by resistor 26 serves to increase the potential existing between this slider arm and ground. The slider arm of resistor 27 is connected to the clutch 10 through conductor 11.

The batteries 18 and 24 are chosen so that their outputs are slightly less than the amplified outputs of the thermocouples 7 and 8 when said thermocouples are in contact with the hot-ore fines. Therefore, since the negative output of the batteries "bucks" that of the DC amplifiers, current will flow through the rectifiers to energize the relays 16 and 22 only when the amplified output from the thermocouples exceeds that of the batteries. This of course occurs when the thermocouples are in contact with the hot-ore fines.

Assuming that the level of hot-ore fines in the chute 1 is below the thermocouple 8 and consequently below the desired level, each of the thermocouples 7 and 8 is out of contact with the hot fines and thus the relays 16 and 22 are both de-energized with relay 16 open and relay 22 closed, as shown in the drawing. Since relay 16 is open, the resistance provided by resistor 25 is added to that of resistor 27 to lower the potential between the slider arm of resistor 27 and ground. Therefore, the voltage input to the clutch 10 is relatively low, which causes it to operate the briquetting rolls at a correspondingly low speed. If this low-speed operation of the rolls causes the level of fines to rise in the chute to a point between the thermocouples 7 and 8, the contact between thermocouple 8 and the hot fines will cause relay 16 to be energized and thus close. In this instance, the resistor 25 will be short circuited as is the resistor 26, since relay 22 is in its normally closed position. This increases the potential on the slider arm of resistor 27, since the resistance provided by resistor 25 is no longer interposed between it and the battery 28. The resulting increased voltage input to the clutch 10 causes it to operate the briquetting rolls at a correspondingly increased speed. If after continued operation the level of fines in the chute rises above the location of the thermocouple 7, the relay 22 will be energized. In this instance, relay 16 will be closed and relay 22 will be open. Since relay 22 is open, the resistance supplied by resistor 26 will be applied between the slider arm of resistor 27 and ground, which increases the potential on the slider arm over that previously existing. Hence, the voltage applied to the clutch 10 is further increased to effect an additional increase in the speed of the briquetting rolls.

It may be seen from the above description of our control system that the speed of the briquetting rolls is automatically changed to any one of three levels in response to the level of the hot-ore fines within the chute. If the fines are at the desired level, the rolls are operated at an intermediate speed. However, if the level of fines increases to a point above the thermocouple 7 where plugging of the kiln or other operating difficulties may be encountered, the speed of the briquetting rolls is increased so that increased quantities of fines are utilized. If the fines drop to a dangerously low level in the chute, below the thermocouple 8, the speed of the briquetting rolls is lowered so that smaller quantities of fines are required.

Although the apparatus shown in the drawing and described herein controls the operation at only three speeds, any desired number of speeds may be provided for by merely using additional thermocouples and the required components associated therewith, such as the relays and variable resistors. It may be seen that the system provides for preselecting the three speeds at which the briquetting rolls will be made to operate by manually positioning the slider arms along the slide wires of the variable resistors 25, 26, and 27.

From the foregoing it will be apparent that the system of this invention operates to control the speed of the briquetting rolls 2 in accordance with the rate at which heated blast furnace flue dust or other loose iron ore bearing material is fed thereto from a heating furnace. In thus regulating the speed of the briquetting rolls 2, it will be further apparent that the system of this invention operates to maintain the transfer chute 1 filled with material to the level 6 between upper and lower limits determined respectively by the vertical positions of the thermostats 7 and 8. In this manner the system of this invention operates to produce briquettes of improved quality in regard to their having the desired density and hardness, and also to prevent operational failures as the result of material stoppages from plugging in the chute 1 or the kiln supplying heated material thereto.

While one embodiment of my invention has been shown and described, it will be apparent that adaptations and modifications may be made without departing from the scope of the appended claims.

We claim:

1. In briquetting apparatus of the type including a pair of power driven rolls for forming briquettes from loose material and means for feeding said material to said rolls at varying rates, the combination therewith of means for measuring the rate at which said material is fed to said rolls, means for adjusting the speed of operation of said rolls, and means responsive to said rate measuring means for regulating said speed adjusting means to operate said rolls at speeds corresponding to the said rate of material feed.

2. Briquetting apparatus having, in combination, a pair of power rolls for forming briquettes from loose material, means for feeding said material to said rolls at varying rates, a variable speed drive for rotating said rolls, means for measuring the rate at which said material is delivered to said rolls by said feeding means, regulating means for adjusting the speed of said drive and thereby the speed at which said rolls are rotated, and means responsive to said rate measuring means for operating said regulating means to rotate said rolls at speeds corresponding to the said rate of material feed.

3. The invention defined in claim 2 characterized by said material feeding means comprising a vertically inclined chute through which said material is delivered from a source of supply to said rolls, and by said rate responsive means operating through said regulating means to maintain said chute filled with material to a predetermined vertical level.

4. In briquetting apparatus of the type including a pair of power driven rolls for forming briquettes from loose material, a vertically inclined chute through which said material is delivered to said rolls, and means for feeding said material to said chute at varying rates, the combination therewith of a variable speed drive for rotating said rolls, and means responsive to the rate at which said material is delivered to said chute by said feeding means for regulating the speed of said drive and thereby the rotational speed of said rolls to maintain said chute filled with said material to a predetermined level.

5. The invention defined in claim 4 characterized by said rate measuring means comprising a pair of vertically spaced level detector devices in said chute, and by said rate responsive means including means controlled by said devices and operating to maintain the said level of material in said chute vertically between the vertical positions of said detector devices.

6. A briquetting apparatus comprising, the combination with a pair of power driven rolls for forming-briquettes from loose material, a vertically inclined chute through which said material is delivered to said rolls, and means for feeding said material to said chute at varying rates, of a variable speed drive for rotating said rolls, and means operating to maintain said chute filled with material to a vertical level between upper and lower limits comprising a pair of vertically spaced thermostats respectively located in said chute at vertical levels corresponding to said upper and lower limits, and means actuated by said thermostats for regulating the speed of rotation of said rolls by said drive to maintain said vertical level between said upper and lower limits.

7. A briquetting apparatus comprising, a pair of power driven rolls for forming briquettes from loose material, a variable speed drive for rotating said rolls, a vertically inclined chute through which said material gravitates to said rolls, means for feeding said material to said chute at varying rates, a pair of level detecting devices located respectively at upper and lower levels in said chute and operating respectively in response to the level of material in said chute moving to points respectively above or below said vertically spaced levels, means for adjusting the speed of said drive, and control means actuated by said level detecting devices for operating said speed adjusting means to rotate said rolls at speeds effective to maintain the level of said material in said chute between said upper and lower levels.

8. Briquetting apparatus for producing iron-ore briquettes comprising, the combination with a pair of briquetting rolls and a vertically inclined chute for delivering hot-ore fines to said rolls, of a variable speed power drive for rotating said rolls, and regulating means for adjusting the operation of said drive to control the speed of said rolls comprising a pair of thermocouples at vertically spaced levels in said chute, and speed regulating means operated by said thermocouples when the level of the material in said chute is between said thermocouples to operate said rolls as a predetermined intermediate speed, said regulating means including a first relay means operating when said material level is above the upper one of said thermocouples to operate said rolls at a faster speed, and a second relay means operating when said material level is below the lower one of said thermocouples to operate said rolls at a slower speed.

9. A briquetting apparatus comprising, the combination with a pair of power driven rolls for forming briquettes from loose material, a vertically inclined chute through which said material is delivered to said rolls, and means for feeding said material to said chute at varying rates, of a variable speed drive for rotating said rolls, and means operating to maintain said chute filled with material to a vertical level between upper and lower limits comprising control means including a thermostat located in said chute at a vertical level corresponding to one of said limits, and means actuated by said control means for regulating the speed of rotation of said rolls by said drive to maintain said vertical level between said upper and lower limits.

References Cited

UNITED STATES PATENTS

| | | | |
|---|---|---|---|
| 2,156,895 | 5/1939 | Godat | 18—2 |
| 2,736,923 | 3/1956 | Schieser et al. | 18—2 XR |
| 2,775,257 | 12/1956 | Stirn et al. | 18—2 XR |
| 2,916,792 | 12/1959 | Crook et al. | 18—2 XR |
| 2,977,631 | 4/1961 | Komarek et al. | 18—9 XR |
| 3,122,784 | 3/1964 | Jolliffe | 18—2 |
| 3,124,837 | 3/1964 | Jackson et al. | 18—9 |
| 3,174,846 | 3/1965 | Brisse et al. | 75—3 |

WILLIAM J. STEPHENSON, *Primary Examiner.*